US006538220B2

(12) United States Patent
Durocher (10) Patent No.: US 6,538,220 B2
(45) Date of Patent: Mar. 25, 2003

(54) SWITCH POD ASSEMBLY

(75) Inventor: Daniel J. Durocher, Leonard, MI (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/840,366

(22) Filed: Apr. 23, 2001

(65) Prior Publication Data

US 2002/0153234 A1 Oct. 24, 2002

(51) Int. Cl.⁷ .............................................. H01H 9/00
(52) U.S. Cl. ................................................. 200/61.54
(58) Field of Search ......................... 200/61.27–61.38, 200/61.54–61.57, 61.85, 308–317, 52 R; 180/90; 307/10.1

(56) References Cited

U.S. PATENT DOCUMENTS

| | | | | |
|---|---|---|---|---|
| 4,180,713 A | * | 12/1979 | Gonzales | 200/52 R |
| 4,352,401 A | * | 10/1982 | Vitaloni | 180/90 |
| 4,368,454 A | | 1/1983 | Pilatzki | 74/484 R |
| 4,496,810 A | * | 1/1985 | Suzuki et al. | 200/61.3 |
| 4,503,296 A | * | 3/1985 | Iwata et al. | 200/61.27 |
| 4,518,836 A | * | 5/1985 | Wooldridge | 200/61.54 |
| 4,571,470 A | * | 2/1986 | Hattori | 200/61.54 |
| 4,590,341 A | * | 5/1986 | Iwata et al. | 200/61.54 |
| 4,655,308 A | | 4/1987 | Kraus et al. | 180/78 |
| 4,900,946 A | * | 2/1990 | Williams et al. | 307/10.1 |
| 5,714,727 A | | 2/1998 | Lexznar et al. | 260/61.54 |
| 5,739,491 A | * | 4/1998 | Crosson, Jr. | 200/61.54 X |
| 5,762,506 A | | 6/1998 | DuRocher | 439/164 |
| 5,855,144 A | * | 1/1999 | Parada | 200/61.54 |
| 5,917,163 A | | 6/1999 | Lecznar et al. | 200/61.54 |

FOREIGN PATENT DOCUMENTS

EP 0704344 12/1999

* cited by examiner

Primary Examiner—J. R. Scott
(74) Attorney, Agent, or Firm—Tarolli, Sundheim, Covell & Tummino L.L.P.

(57) ABSTRACT

A switch pod assembly (10) includes a hub portion (30) fixedly connected to a steering column (12) adjacent a steering wheel (20). First and second arms (40, 50) extend radially from opposite sides of an outer surface (32) of the hub portion (30). First and second switch pod modules (60, 70) extend transversely from second ends (44, 54) of the first and second arms (40, 50), respectively. Each switch pod module (60, 70) has a curved outer surface (62, 72) that has a radius generally concentric with and smaller than a radius of the steering wheel (20). The outer surfaces (62, 72) are positioned proximate the steering wheel (20). The first and second switch pod modules (60, 70) support a plurality of switches (80), including actuators (112) positioned along the curved outer surfaces (62, 72) of the first and second switch pod modules.

23 Claims, 12 Drawing Sheets

SWITCH POD ASSEMBLY

FIELD OF THE INVENTION

The present invention relates to operator actuated electrical switches in a vehicle. In particular, the present invention relates to a switch pod assembly for mounting on the steering column of a vehicle.

BACKGROUND OF THE INVENTION

A known vehicle includes electrical switches for actuating vehicle components such as headlights, windshield wipers, and turn signals. The known electrical switches include push buttons, rotary switches, and toggle switches. Such electrical switches may be mounted on a dash, steering wheel, or steering column of the vehicle.

SUMMARY OF THE INVENTION

The present invention is a switch pod assembly for mounting to a steering column in a vehicle. The switch pod assembly includes a generally cylindrical hub portion adapted to be fixedly connected to the steering column adjacent a steering wheel of the vehicle. First and second arms extend radially from an outer surface of the hub portion on opposite sides of the hub portion. Each of the first and second arms has a first end connected to the hub portion and an opposite second end.

First and second switch pod modules extend from the second ends of the first and second arms, respectively, in a direction generally transverse to the first and second arms. Each of the switch pod modules has a curved outer surface that has a radius generally concentric with a radius of the steering wheel. The radius of the outer surface is smaller than the radius of the steering wheel. The outer surfaces of the first and second switch pod modules are positioned proximate the steering wheel. A plurality of switches are supported by the first and second switch pod modules. The switches include actuators positioned along the curved outer surfaces of the first and second switch pod modules.

BRIEF DESCRIPTION OF THE DRAWINGS

The foregoing and other features of the present invention will become apparent to one skilled in the art to which the present invention relates upon consideration of the following description of the invention with reference to the accompanying drawings, in which:

FIG. 6b is an enlarged view of a portion of the switch pod assembly of FIG. 6a;

FIG. 7 is an exploded view of a portion of the switch pod assembly of FIG. 6a;

DESCRIPTION OF THE PREFERRED EMBODIMENTS

Figure 1:
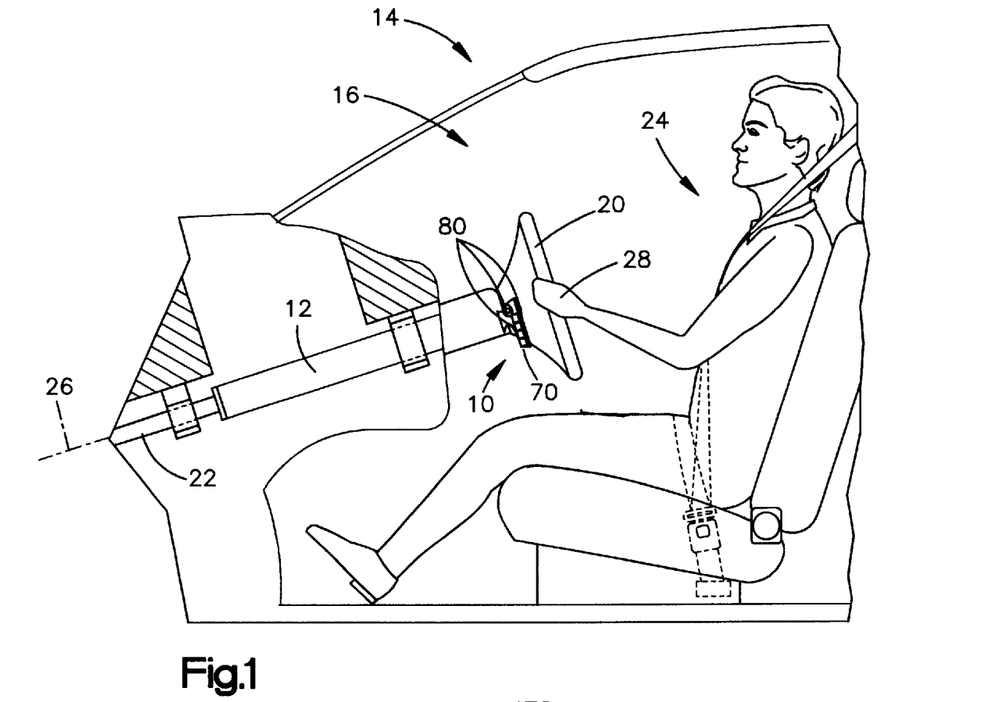
FIG. 1 is a schematic view of a switch pod assembly mounted in a vehicle in accordance with the present invention.

As representative of the present invention, FIG. 1 illustrates a switch pod assembly 10. The switch pod assembly 10 is mounted on a steering column 12 of a vehicle 14. A steering wheel 20, located in an occupant compartment 16 of the vehicle 12, is connected to a steering shaft 22 that extends through the steering column 12. A vehicle occupant 24 may rotate the steering wheel 20 and steering shaft 22 about a steering axis 26 to effect steering movement of the vehicle 14 in a known manner.

Figure 2:
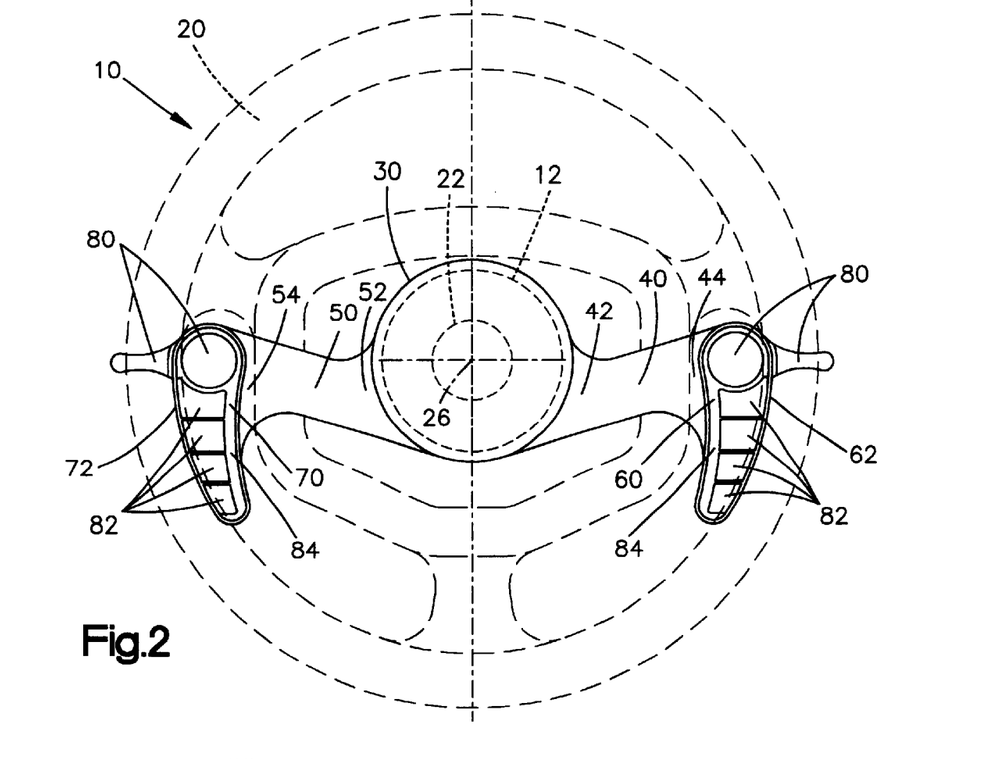
FIG. 2 is an enlarged front view of the switch pod assembly of FIG. 1.
Figure 3:
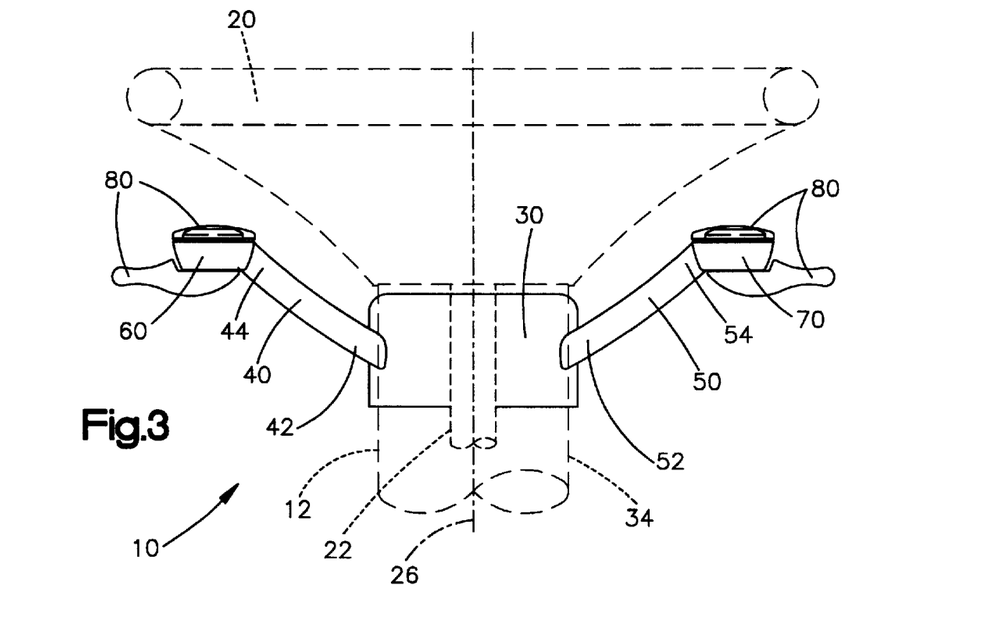
FIG. 3 is a top view of the switch pod assembly of FIG. 2.
Figure 4:
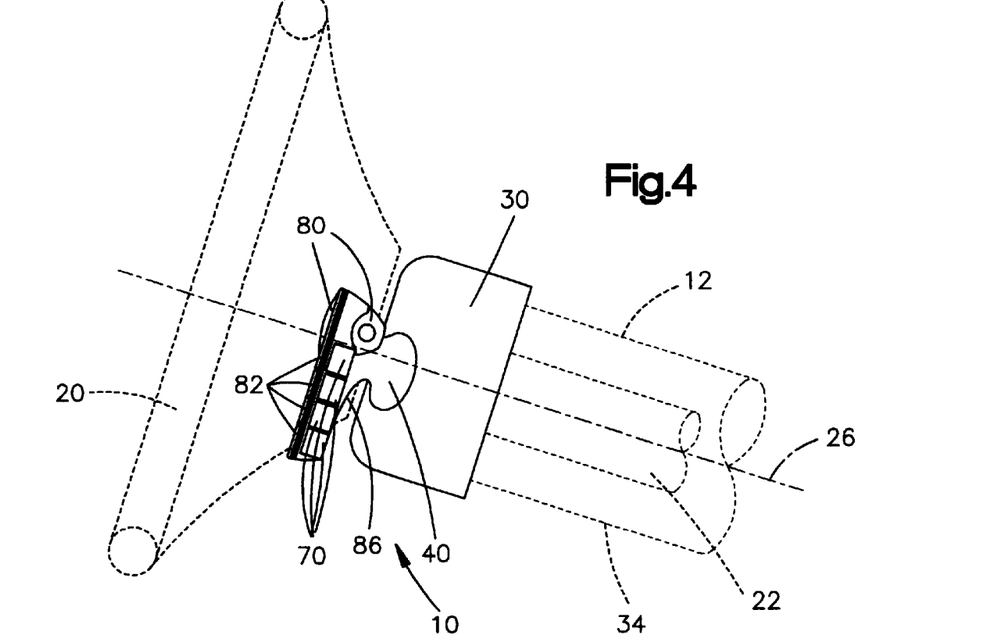
FIG. 4 is a side view of the switch pod assembly of FIG. 2.

As illustrated in FIGS. 2–4, the switch pod assembly 10 includes a generally cylindrical hub portion 30 centered on the steering axis 26 and fixedly connected to the steering column 12. Thus, the steering wheel 20 and the steering shaft 22 rotate relative to the switch pod assembly 10. In the illustrated embodiment, the hub portion 30 is shown having a diameter slightly greater than the diameter of the steering column 12. Those skilled in the art, however, will recognize that the hub portion 30 may have a diameter equal to the steering column 12 such that the outer surface 32 of the hub portion 30 coincides with an outer surface 34 of the steering column or a steering column jacket (not shown). Also, the hub portion 30 may have a shape different than the illustrated cylindrical shape. For example, the hub portion 30 may have a rectangular shape, an irregular shape, or any other shape that corresponds to the functional, aesthetic, or ergonomic design of the vehicle 14.

First and second arms 40 and 50, respectively, extend in generally opposite lateral directions from the outer surface 32 of the hub portion 30. The first and second arms 40 and 50 have a generally contoured tubular construction. As best illustrated in FIG. 3, the first and second arms 40 and 50 extend away from the hub portion 30 at an acute angle towards the steering wheel 20. The first arm 40 (FIGS. 2–4) has a first end 42 connected to the hub portion 30 and an opposite second end 44. The second arm 50 has a first end 52 connected to the hub portion 30 and an opposite second end 54.

First and second switch pod modules 60 and 70 are connected to the second ends 44 and 54 of the first and second arms 40 and 50, respectively, and extend generally transverse to the first and second arms. The first and second switch pod modules 60 and 70 are generally elongated and have a contoured kidney-shaped configuration. The first switch pod module 60 has a curved outer surface 62 with a radius generally concentric with the radius of the steering wheel 20. In the illustrated embodiment, the curved outer surface 62 of the first switch pod module 60 extends radially between about the three and four o'clock positions with respect to the steering wheel 20, as viewed in FIG. 2. The second switch pod module 70 also has a curved outer surface 72 with a radius generally concentric with the radius of the steering wheel 20. In the illustrated embodiment, the curved outer surface 72 of the second switch pod module 70 extends radially between about the eight and nine o'clock positions with respect to the steering wheel 20, as viewed in FIG. 2.

The radius of each of the outer surfaces 62 and 72 is smaller than the radius of the steering wheel 20.

Each of the switch pod modules 60 and 70 supports a plurality of electrical switches 80 for actuating electrical devices (not shown) in the vehicle such as turn signals, headlights, windshield wipers, climate control, cruise control, vehicle audio systems, telephone, etc. The switch pod modules 60 and 70 also include a plurality of indicators 82 exposed on a front surface 84 of the switch pod modules viewable from the passenger compartment 16 (FIG. 1) of the vehicle 14.

Figure 5:
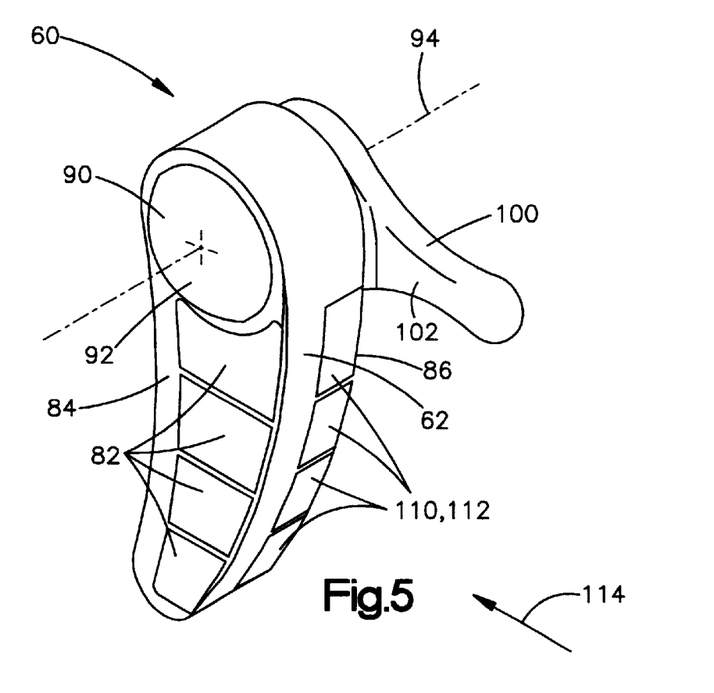
FIG. 5 is a perspective view of a portion of the switch pod assembly of FIG. 2.

The first switch pod module 60 is illustrated in FIG. 5. The first switch pod module 60 is substantially identical to the second switch pod module 70, except that the second switch pod module is a mirror image of the first switch pod module. Therefore, the first switch pod module 60 will be discussed in detail with the understanding that, unless otherwise noted, the description holds true for the second switch pod module 70 as well.

The first switch pod module 60 supports first and second rotary switches 90 and 100, respectively, and four pushbutton switches 110. The first rotary switch 90 includes an actuator in the form of a thumb wheel 92 that is rotatable about an axis 94 to select a desired switch position. The first rotary switch 90 is supported by the first switch pod module 60 such that the thumb wheel 92 is exposed on the front surface 84 of the module.

The second rotary switch 100 includes an actuator in the form of a paddle 102 that is pivotable to select a desired switch position. Preferably, the second rotary switch 100 is pivotable about the same axis 94 as the first rotary switch 90. The second rotary switch 100 is supported by the first switch pod module 60 such that the paddle 102 extends laterally relative to the outer surface 62 of the module.

The pushbutton switches 110 each include an actuator in the form of a pad 112 that is depressable to actuate the switch. The pushbutton switches 110 are supported by the first switch pod module 60 such that the pads 112 are arranged along the outer surface 62 of the module. The pads 112 are exposed along the outer surface 62 and along a rear surface 86 (FIGS. 4 and 5) of the first switch pod module 60, opposite the front surface 84 of the module. The pads 112 are depressable in a generally inward direction towards the steering column 12 (FIGS. 2–4). The inward direction is indicated generally by the arrow 114 in FIG. 5.

The first switch pod module 60 supports four indicators 82. The indicators 82 are positioned on the front surface 84 such that a pushbutton 110 lies directly behind the indicator on the first switch pod module 60. The indicators 82 thus may serve as indicia for identifying the function of the corresponding pushbutton 110 that lies behind it. Such indicia may be in the form of an alphanumeric label, such as a silk-screened laminate, or even an LCD programmable to display the function of the corresponding pushbutton 110. The indicators 82 may include means (not shown), such as an LED, for illuminating the indicia. The indicators 82 may also include means, such as an LED, for indicating the condition, such as an "on" or "off" condition, of the device controlled via the corresponding pushbutton 110. In the instance where the indicia is an LCD, the means for indicating the condition of the device may be programmed to be displayed via the LCD.

The first and second switch pod modules 60 and 70 are positioned proximate the steering wheel 20. By proximate, it is meant that when the vehicle operator 24 grasps the steering wheel 20 in a conventional manner as illustrated in FIG. 1, the operator's hands 28 are positioned near the switch pod modules 60 and 70. This allows the operator 24 to use his or her fingers to actuate the switches 80 easily and conveniently while maintaining a grip on the steering wheel 20. The switches 80 should be positioned within about five inches from the steering wheel 20. Preferably, the switches are positioned between about two to four inches from the steering wheel 20.

Figure 6A:
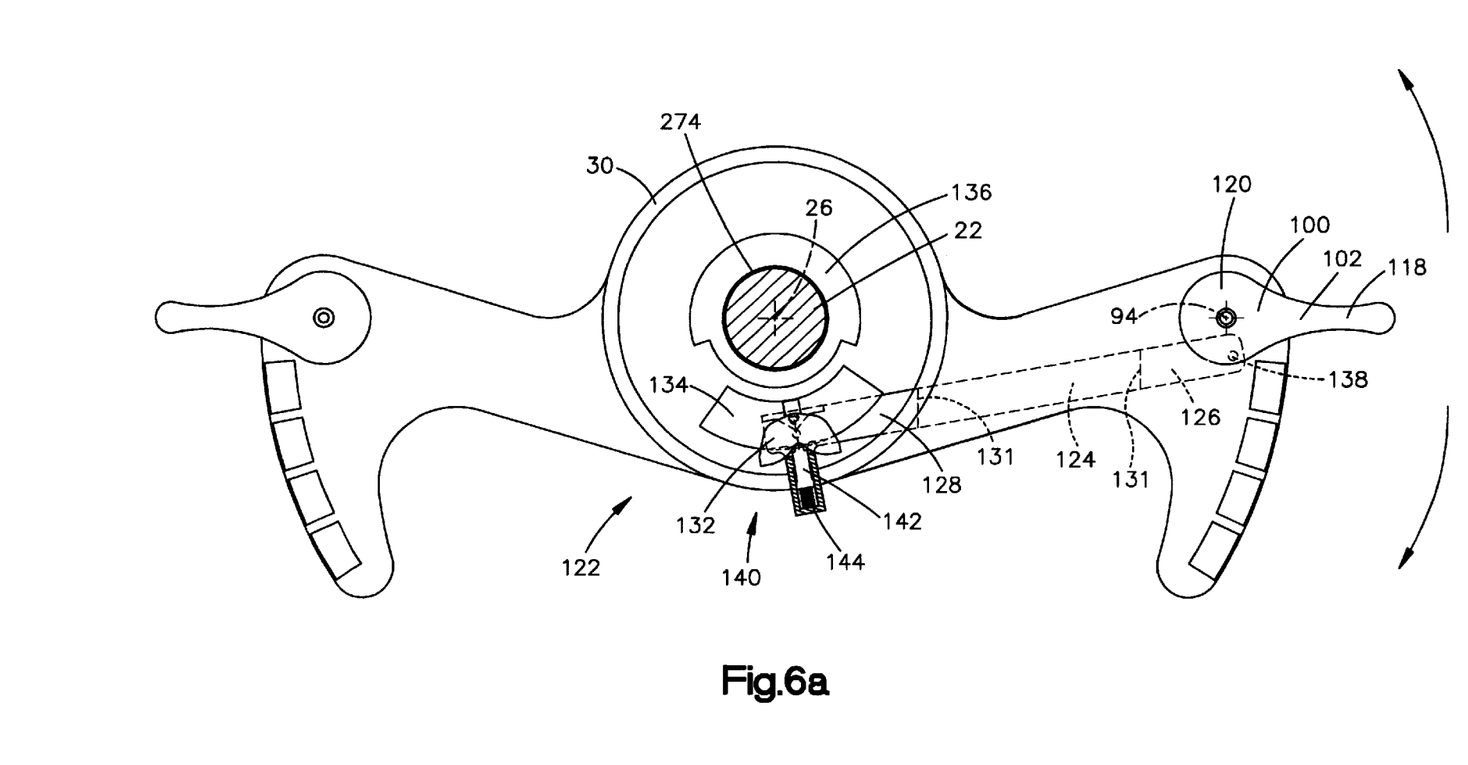
FIG. 6a is an enlarged rear view of the switch pod assembly of FIG. 2, partially in section, with certain parts shown schematically.

Referring to FIG. 6a, the second rotary switch 100 on the second switch pod module 70 comprises a turn signal switch 118. The paddle 102 of the turn signal switch 118 comprises a turn signal lever 120 connected to a turn signal cancel mechanism 122 by a linkage 124. The cancel mechanism 122 is connected to the hub portion 30 adjacent or near the steering shaft 22. The linkage 124 extends through the second arm 50 from the turn signal lever 120 to the cancel mechanism 122.

A first end portion 126 of the linkage 124 is pivotally connected to the turn signal lever 120 by means 138 such as a pin. A second end portion 128 of the linkage 124, opposite the first end portion 126, forms part of the cancel mechanism 122. A central portion 130 of the linkage extends between the first and second end portions 126 and 128. The linkage 124 may be bent along fold lines 131 or otherwise formed such that the central portion 130 extends at an acute angle from the first and second end portions 126 and 128 in order to account for the diagonal extension of the second arm 50.

Figure 6B:
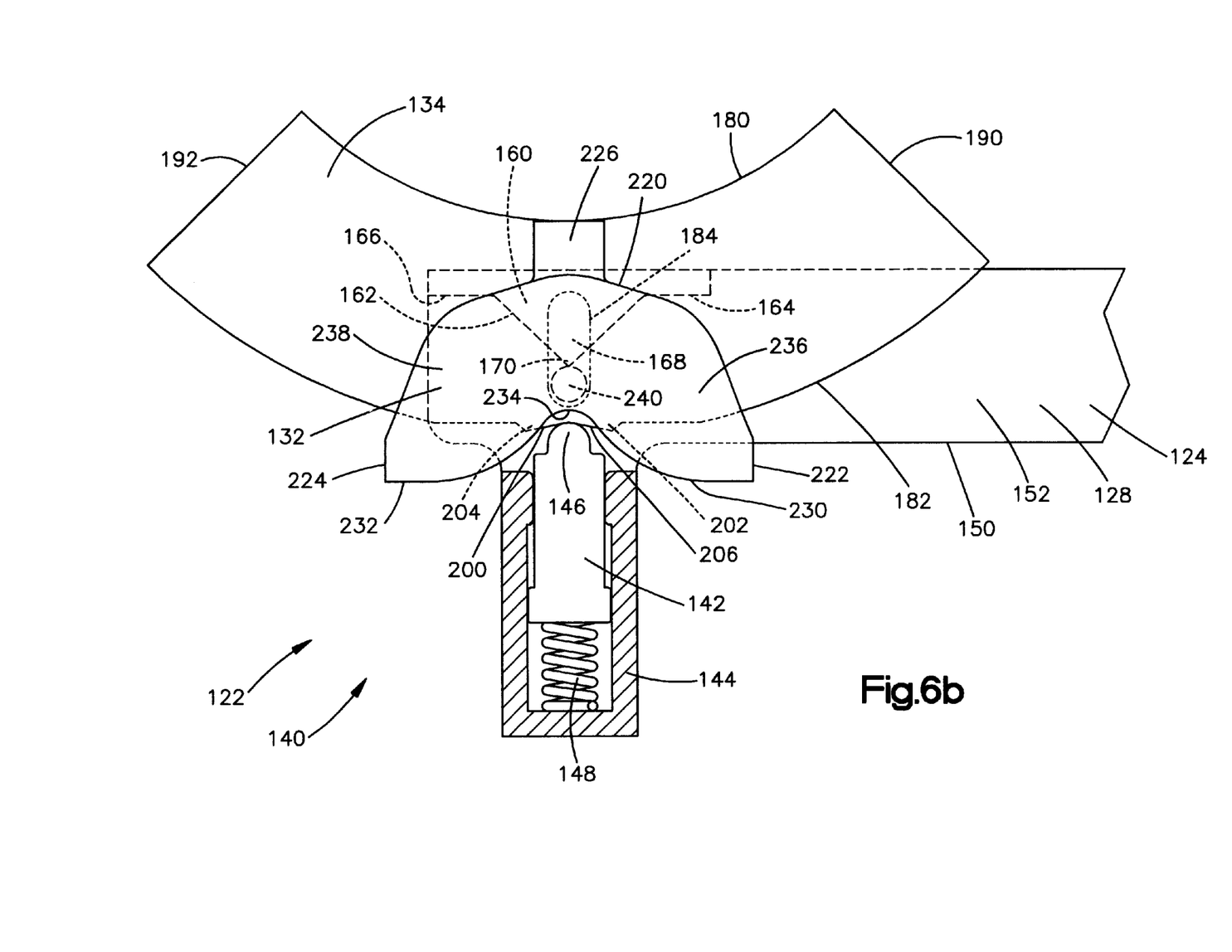
Figure 7:
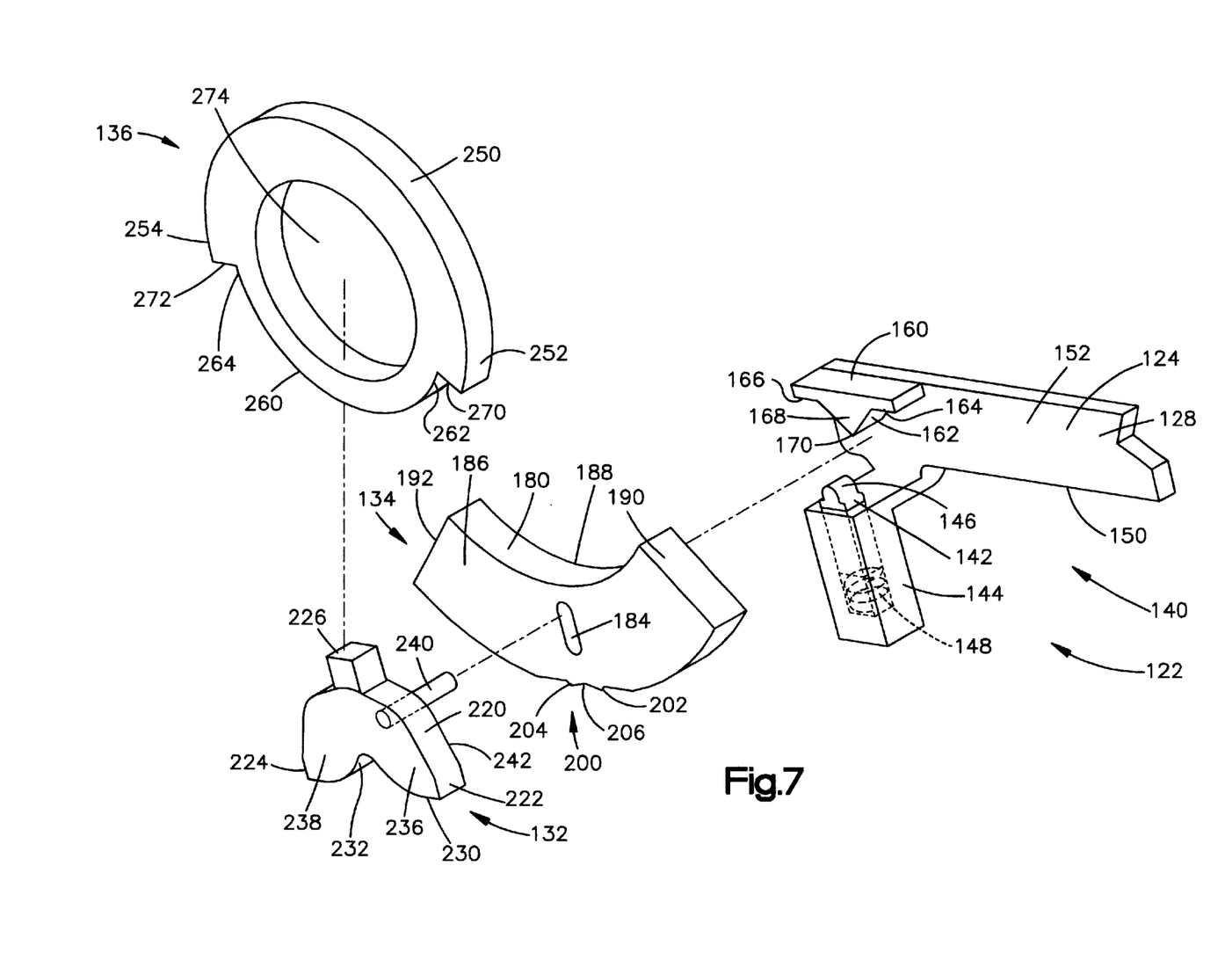

The cancel mechanism 122 is illustrated in FIGS. 6b and 7. The cancel mechanism 122 includes a cancel pawl 132, a guide plate 134, a cancel cam 136, and a latch mechanism 140. The latch mechanism 140 is formed on the second end portion 128 of the linkage 124. The latch mechanism 140 includes a latch plunger 142 slidably mounted in a plunger sleeve 144. As illustrated in FIGS. 6b and 7, a tip 146 of the latch plunger 142 protrudes from the plunger sleeve 144. A plunger spring 148 is disposed in the plunger sleeve 144 beneath and in abutting engagement with the latch plunger 142. The plunger spring 148 biases the latch plunger 142 out of the plunger sleeve 144 in a generally vertical direction as viewed in FIG. 6b.

The plunger sleeve 144 extends from a lower edge 150 of the second end portion 128 of the linkage 124 in a direction perpendicular to the length of the second end portion. As best shown in FIG. 7, the plunger sleeve 144 is offset from the second end portion 128 such that the latch plunger 142 may extend out of the sleeve into a position spaced from a front surface 152 of the second end portion.

The latch mechanism 140 (FIGS. 6b and 7) also includes a pawl guide 160 that has a cam surface 162 facing towards the latch plunger 142. The cam surface 162 has first and second horizontally extending side portions 164 and 166, respectively, and a center portion 168, disposed between the side portions. The center portion 168 has a generally inverted triangular shape forming a tip 170 of the center portion. The pawl guide 160 extends from the front surface 152 of the second end portion 128 of the linkage 124, in a direction generally perpendicular to the length of the second end portion. The center portion 168 of the pawl guide is positioned generally vertically above the latch plunger 142. The latch plunger 142, however, is spaced from the front surface 152 a greater distance than the pawl guide 160, thus providing a clearance between the latch plunger and the pawl guide. This allows the latch plunger 142 to extend vertically and in front of the pawl guide 160, as viewed in FIG. 6b.

The plunger sleeve 144 (FIGS. 6b and 7) and the pawl guide 160 are illustrated as being formed integrally with the linkage 124. In such an instance, the linkage 124, plunger sleeve 144 and pawl guide 160 may be formed from a single piece of material, such as molded plastic or metal. Those skilled in the art will recognize, however, that the linkage 124, plunger sleeve 144 and pawl guide 160 may be formed as separate pieces and from different materials, in which case the pieces would be assembled together by known means, such as adhesives, fasteners, or by designing the pieces to interlock with each other.

The guide plate 134 has an upper edge 180 and an opposite lower edge 182 that are generally arc-shaped and extend parallel to each other. An elongated pin aperture 184 is centered between first and second opposite ends 190 and 192 of the guide plate 134 and extends through the guide plate from a front surface 186 to a rear surface 188 of the plate. The pin aperture 184 extends in a direction transverse to the upper and lower edges 180 and 182, generally vertically as viewed in FIGS 6b and 7.

A reaction surface 200 is formed on the lower edge 182 of the guide plate 134. The reaction surface 200 includes first and second teeth 202 and 204 that are positioned adjacent to each other and project from the lower edge 182 of the guide plate 134. The first and second teeth 202 and 204 are centered below the pin aperture 184. The first and second teeth 202 and 204 define a notch 206 positioned between the teeth and centered below the pin aperture 184.

The cancel pawl 132 has a generally arc-shaped upper edge 220 that has a first end 222 and an opposite second end 224. A cancel tooth 226 projects radially from the upper edge 220 of the cancel pawl 132 and is centered between the first and second ends 222 and 224. First and second cam surfaces 230 and 232 extend along a curved path in a generally upward and inward direction from the first and second ends 222 and 224, respectively. The first and second cam surfaces 230 and 232 meet each other to form a recess 234 positioned vertically below the cancel tooth 226. The cancel pawl 132 thus has generally wing-shaped configuration with first and second wing-shaped lobes 236 and 238. A pin 240 projects perpendicularly from a rear surface 242 of the cancel pawl 132. The pin 240 is vertically aligned with the cancel tooth 226 and the recess 234 and is positioned between the first and second lobes 236 and 238.

The cancel cam 136 (FIG. 7) has an arc-shaped upper surface 250 having a first end 252 and an opposite second end 254, and an arc-shaped lower surface 260 having a first end 262 and an opposite second end 264. The upper and lower surfaces 250 and 260 are concentric and each have a respective radius. The radius of the upper surface 250 is greater than the radius of the lower surface 260. The first end 252 of the upper surface 250 is spaced from the first end 262 of the lower surface 260 and the second end 254 of the upper surface 250 is spaced from the second end 264 of the lower surface 260. A first cam surface 270 extends between the first ends 252 and 262. A second cam surface 272 extends between the second ends 254 and 264. A circular aperture 274 extends through the center of the cancel cam 136.

The cancel mechanism 122 is assembled in the in the switch pod assembly 10 as illustrated in FIGS. 6a, 6b and 7. The cancel cam 136 is attached to the steering shaft 22 such that the shaft extends through the aperture 274. The cancel cam 136 is thus rotatable with the steering shaft 22 about the axis 26. The guide plate 134 is connected to the hub portion 30 in a known manner (not shown) such that the guide plate remains stationary relative to the hub portion. The cancel pawl 132 is positioned such that the pin 240 extends through the pin aperture 184 and protrudes from the rear surface 188 of the guide plate 134. The cancel pawl 132 is thus slidable along the pin aperture 184 and rotatable about the pin 240. The latch mechanism 140 (FIG. 7) is placed adjacent the rear surface 188 of the guide plate 134.

The pawl guide 160 is positioned adjacent the rear surface 188 of the guide plate 134 such that the tip 170 (FIG. 6a) of the center portion 168 is aligned with the pin aperture 184. The cancel pawl 132 is biased in a generally upward direction as viewed in FIG. 6a by means (not shown), such as a spring, which biases the pin 240 into engagement with the cam surface 162 of the pawl guide 160. In the position illustrated in FIG. 6a, the pin 240 is biased against the tip 170 of the center portion 168.

The latch plunger 142 is positioned adjacent the reaction surface 200 on the lower edge 182 of the guide plate 134. The tip 146 of the latch plunger 142 is biased against the reaction surface 200 by the plunger spring 148. In the position illustrated in FIG. 6a, the tip 146 of the latch plunger 142 is biased into the notch 206 of the reaction surface 200.

The turn signal lever 120 is rotatable about the axis 94 in opposite directions indicated generally by the curved arrows in FIG. 6a. The linkage 124, being pivotally connected to the turn signal lever 120, is imparted to move in opposite linear directions when the turn signal lever is rotated about the axis 280. The linear directions are indicated generally by the straight arrows in FIG. 6a. The linkage 124 moves the latch mechanism 140, i.e. the pawl guide 160, latch sleeve 144 and latch 142 in the linear directions with the linkage when the turn signal lever 120 is rotated.

Figure 9A:
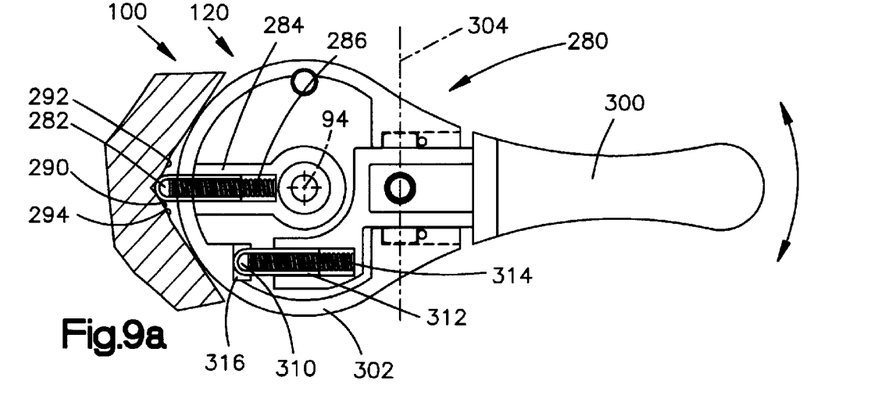
FIGS. 9a–9c are schematic views of another portion of the switch pod assembly of FIG. 6a, with certain parts shown in different positions.
Figure 9B:
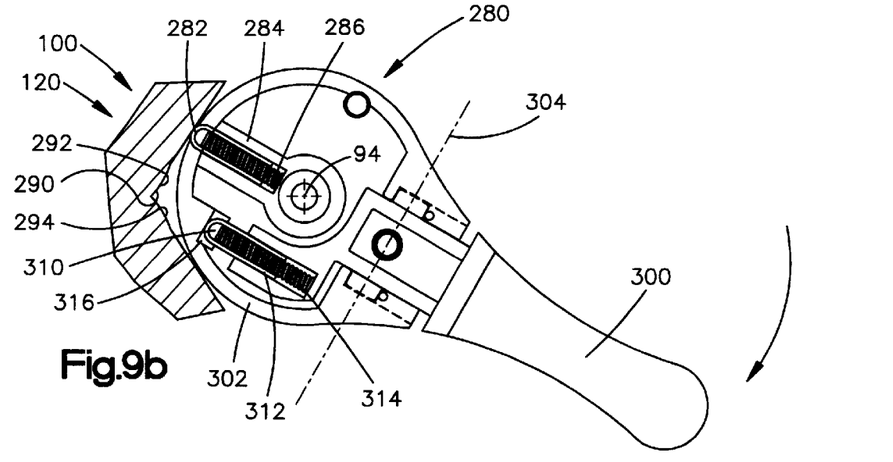
Figure 9C:
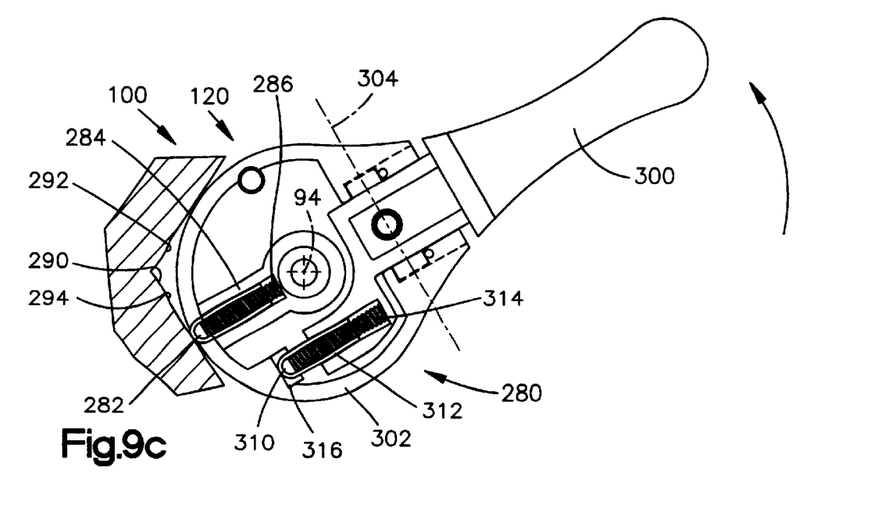

Referring now to FIGS. 9a–9c, the turn signal lever 120 includes a housing 280 that supports a return plunger 282 seated in a sleeve 284 formed in the housing. A spring 286 biases the return plunger 282 against a reaction surface 290. The reaction surface 290 may be a part of the second switch pod module (not shown in FIGS. 9a–9c) or it may be a part of the second rotary switch 100. The reaction surface 290 includes first and second surfaces 292 and 294, respectively, that intersect each other at an angle facing concavely towards the return plunger 282. When the turn signal lever 120 rotates about the axis 94 in the directions indicated generally by the curved arrow in FIGS. 9a–9c, the return plunger 282 slides along the reaction surface 290.

A handle portion 300 of the turn signal lever 120 is rotatable relative to a body portion 302 of the turn signal lever about an axis 304. The axis 304 is perpendicular to and spaced from the axis 94. Thus, the handle portion 300 is rotatable relative to the body portion 302 in a direction perpendicular to the direction in which the turn signal lever 120 is rotatable, i.e., perpendicular to the direction indicated by the curved arrows in FIGS. 9a–9c.

The handle portion 300 of the turn signal lever 120 includes a return plunger 310 seated in a sleeve 312 formed in the handle portion. A spring 314 biases the return plunger 310 against a reaction surface 316. The reaction surface 316 is a part of the body portion 302 of the turn signal lever 120. When the handle portion 300 rotates about the axis 304, the return plunger 310 slides along the reaction surface 316.

The turn signal lever 120 is associated with contacts of the second rotary switch 100. The contacts (not shown) of the second rotary switch 100 are actuatable to operate vehicle directional indicators, i.e., turn signals (not shown). The second rotary switch 100 may comprise a mechanical switch, wherein the mechanical components (not shown) of the switch, including the switching contacts, are housed in the body portion 302 of the turn signal lever 120.

Alternatively, the second rotary switch 100 may comprise contacts operable to actuate a remote switching device, such as a known solid state or electromechanical device. The turn signal lever 120 is thus operable to activate and de-activate the vehicle turn signals.

During operation of the vehicle, the vehicle turn signals are actuated by the operator via the turn signal lever 120. FIGS. 8a–8e illustrate the components of the cancel mechanism 122 in different positions relative to each other when the turn signal lever 120 is moved to different positions.

Figure 8A:
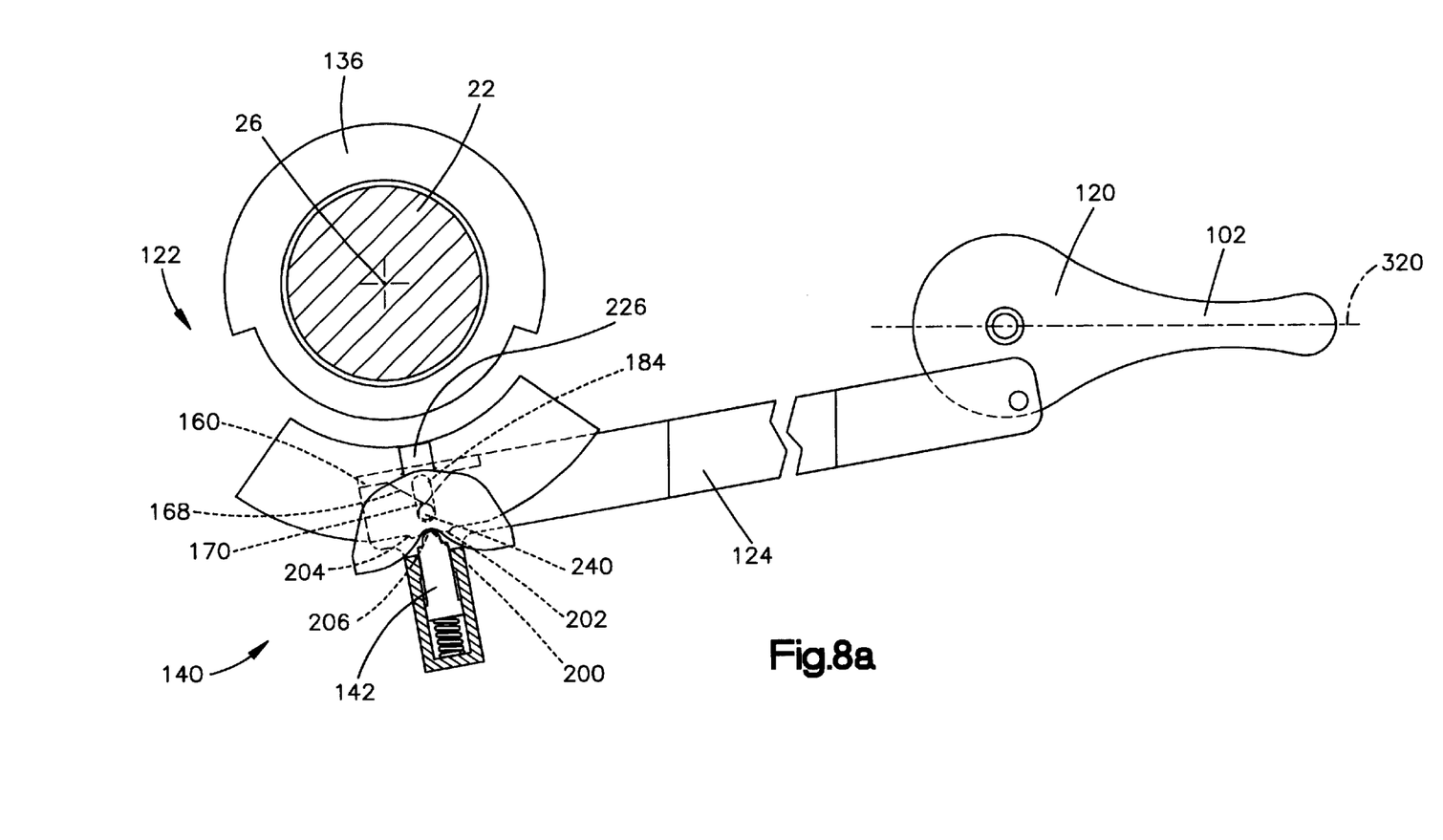
FIGS. 8a–8e are schematic views of a portion of the switch pod assembly of FIG. 6a, with certain parts shown in different positions.

Referring to FIG. 8a, the components of the cancel mechanism 122 are illustrated in a normal, or unactuated, condition of the cancel mechanism. By normal condition, it is meant that the vehicle 14 is being operated under normal driving conditions and the turn signal lever 120 is in an unactuated or "off" condition. In the normal condition of the cancel mechanism 122, the turn signal lever 120 is in a normal position wherein the paddle 102 extends in a generally horizontal direction as illustrated in FIG. 8a along a first centerline 320.

In the normal condition of the cancel mechanism 122, the latch mechanism 140 is positioned such that the latch plunger 142 is biased against the reaction surface 200 in the notch 206 between the first and second teeth 202 and 204. The pin 240 of the cancel pawl 132 is biased against the tip 170 of the center portion 168 of the cam surface 162. This causes the cancel pawl 132 to be positioned in a lowered position wherein the pin 240 is seated in the lower end of the pin aperture 184.

When the cancel pawl 132 is in the lowered position, the cancel tooth 226 positioned out of the path of the cancel cam 136. Thus, when the cancel mechanism 122 is in the normal condition, the cancel cam 136 may rotate with the steering axle 22 about the axis 26 without engaging the cancel tooth 226.

Figure 8B:
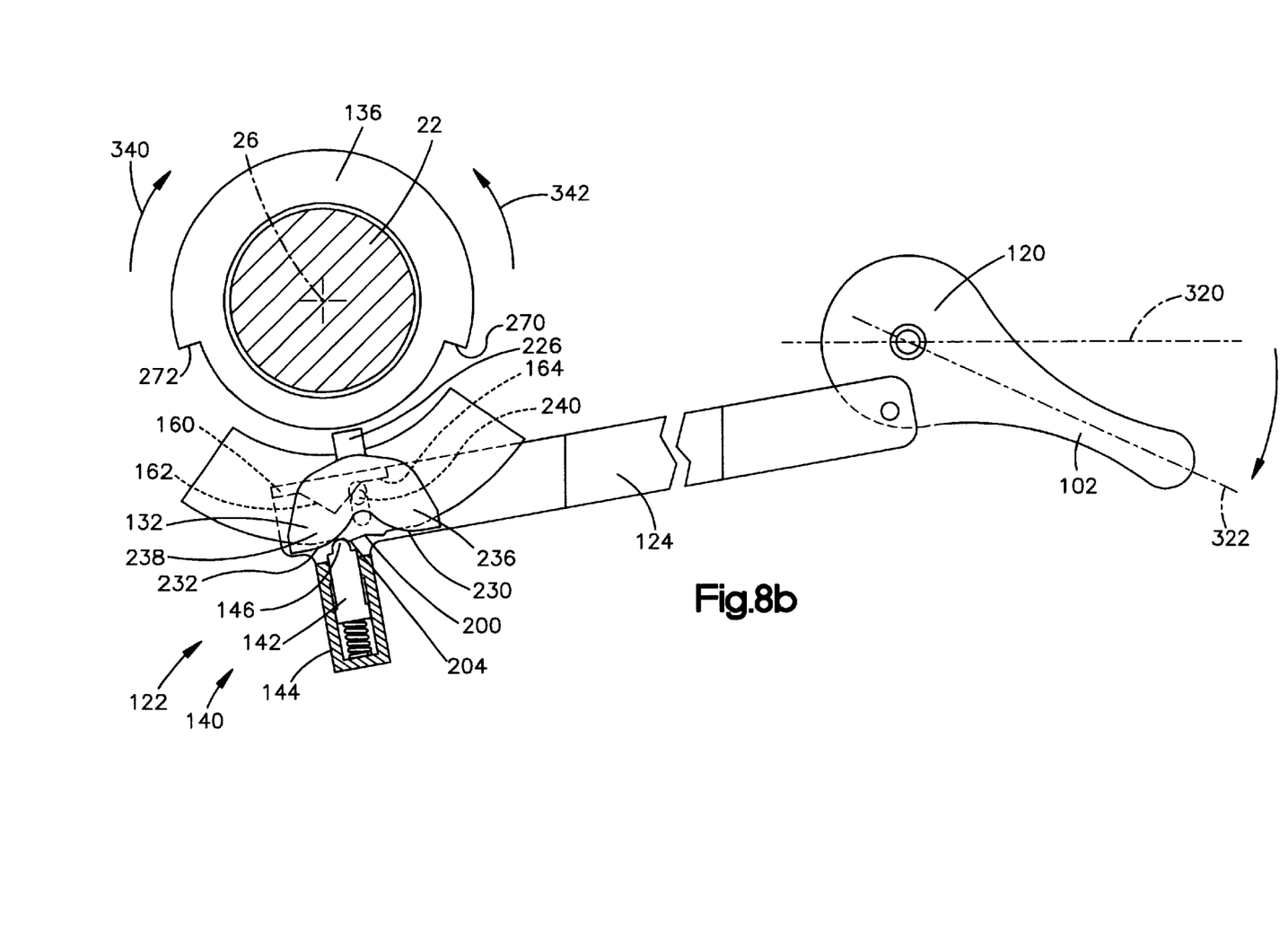

Referring to FIG. 8b, the components of the cancel mechanism 122 are illustrated in a left-turn or "down" condition. By left-turn condition, it is meant that the vehicle 14 is being operated under normal driving conditions and the turn signal lever 120 has been actuated to activate the vehicle's left turn signals. In the left-turn condition, the turn signal lever 120 is rotated in a direction indicated generally by the curved arrow in FIG. 8b into the position illustrated in FIG. 8b. When the turn signal lever 120 is in the left-turn position of FIG. 8b, the paddle 102 is positioned extending along a second centerline 322. The second centerline 322 extends generally downward as viewed in FIG. 8b at an acute angle relative to the first centerline 320.

Referring to FIG. 9b, when the cancel mechanism 122 is in the left-turn condition, the turn signal lever 120 is rotated in a generally clockwise direction to the position illustrated in FIG. 9b. The clockwise direction is indicated generally by the curved arrow in FIG. 9b. As the turn signal lever 120 is rotated towards the position illustrated in FIG. 9b, the return plunger 282 slides along the first surface 292 of the reaction surface 290. As the return plunger 282 slides along the first surface 292, the plunger is urged into the sleeve 284 against the bias of the spring 286. The return plunger 282, biased against the first surface 292, provides a return bias which urges the turn signal lever 120 to rotate about the axis 94 towards the normal condition of FIGS. 8a and 9a. When the turn signal lever 120 is in the left-turn condition, however, the cancel mechanism 122 blocks the turn signal lever 120 from returning to the normal condition under the return bias.

Referring to FIGS. 8a and 8b, when the turn signal lever 120 is rotated to the left-turn condition, the linkage 124 moves to the left as viewed in FIG. 8a to the position illustrated in FIG. 8b. The linkage 124, in turn, causes the latch mechanism 140, i.e. the pawl guide 160, the latch sleeve 144 and, thus, the latch plunger 142 to move to the left as viewed in FIG. 8a to the position illustrated in FIG. 8b. As the latch plunger 142 moves towards the position of FIG. 8b, the plunger slides along the reaction surface 200.

When the cancel mechanism 122 is in the left-turn condition, the latch plunger 142 is biased against the reaction surface 200 adjacent and to the left of the second tooth 204 as viewed in FIG. 8b. As discussed above, the return bias of the turn signal lever 120 urges the cancel mechanism towards the normal condition. The latch plunger 142 engages the second tooth 204, which blocks the latch mechanism 140 from moving towards the normal condition, i.e., to the right as viewed in FIG. 8b. Thus, the latch plunger 142 maintains the cancel mechanism 122 and the turn signal lever 120 in the left-turn condition of FIGS. 8b and 9b.

In the left-turn condition, the pin 240 of the cancel pawl 132 is biased against the first side portion 164 of the cam surface 162. This causes the cancel pawl 132 to be positioned in a first raised position wherein the pin 240 is seated in the upper end of the pin aperture 184 adjacent or near the first side portion 164.

When the cancel pawl 132 is in the first raised position, the cancel tooth 226 is positioned in the path of the cancel cam 136. Thus, when the cancel mechanism 122 is in the left-turn condition, the cancel cam 136 may engage the cancel tooth 226 when the cancel cam rotates with the steering axle 22 about the axis 26. Also, when the cancel pawl 132 is in the first raised position, the second cam surface 232 of the second lobe 238 is positioned adjacent or near the tip 146 of the latch plunger 142.

When the turn signal lever 120 and the cancel mechanism 122 are in the left-turn condition of FIG. 8b, the steering shaft 22 may be rotated about the axis 26 in a left-turn direction, generally clockwise as viewed in FIG. 8b. The steering shaft 22 may also be rotated about the axis 26 in a right-turn direction, generally counterclockwise as viewed in FIG. 8b. The left-turn direction is indicated by the arrow labeled 340 in FIG. 8b, and the right-turn direction is indicated by the arrow labeled 342 in FIG. 8b.

Figure 8C:
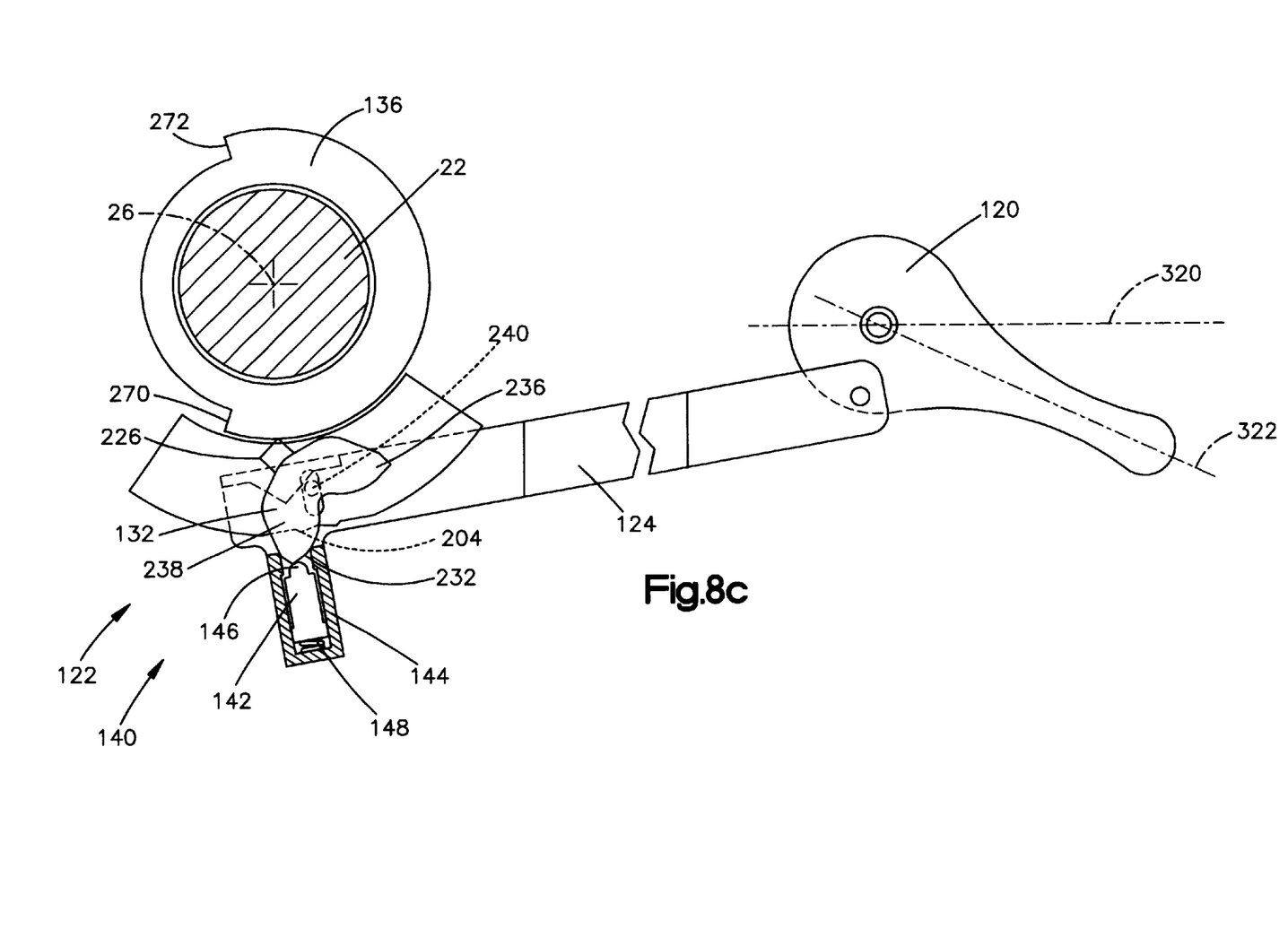

If the steering shaft 22 rotates a given distance in the left-turn direction, the first cam surface 270 will engage the cancel tooth 226. This is illustrated in FIG. 8c. As the steering shaft 22 rotates in the left-turn direction, the first cam surface 270 acts against the cancel tooth 226 and urges the cancel tooth to the left as viewed in FIG. 8c. This causes the cancel pawl 132 to pivot about the pin 240 in a counterclockwise direction as viewed in FIG. 8c. As the cancel pawl 132 pivots, the second cam surface 232 of second lobe 238 engages the tip 146 of the latch plunger 142 and urges the plunger into the latch sleeve 144 against the bias of the spring 148. This causes the latch plunger 142 to become disengaged from the second tooth 204, which releases the latch mechanism 140 and allows the cancel mechanism 122 to return to the normal condition of FIG. 8a under the return bias of the turn signal lever 120.

If the steering shaft 22 rotates a given distance in the right-turn direction while the cancel mechanism 122 is in the left-turn condition, the second cam surface 272 will engage the cancel tooth 226. As the steering shaft 22 rotates in the right-turn direction, the second cam surface 272 would act against the cancel tooth 226 and urge the cancel tooth to the right as viewed in FIG. 8b. This would cause the cancel pawl 132 to pivot about the pin 240 in a clockwise direction as viewed in FIG. 8b. As the cancel pawl 132 pivots, however, the first cam surface 230 of first lobe 236 would not engage the tip 146 of the latch plunger 142 because the latch plunger is positioned adjacent the second lobe 238 when the cancel mechanism 122 is in the left-turn condition. Thus, rotation of the steering column 22 in the right-turn direction when the turn signal lever 120 and the cancel mechanism 122 are in the left-turn condition would not release the latch mechanism 140, cancel mechanism, and turn signal lever to return to the normal condition.

Figure 8D:
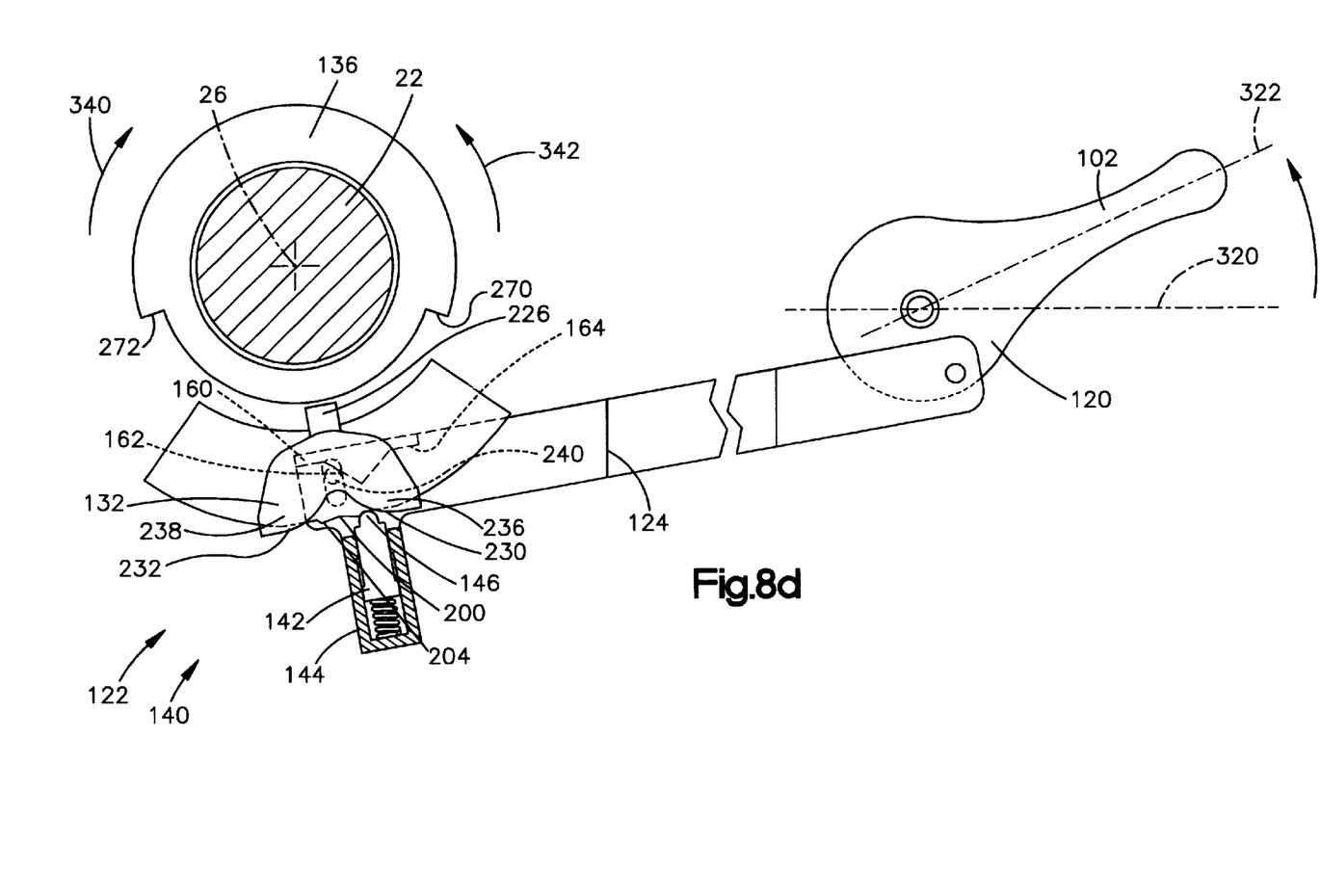

Referring to FIG. 8d, the components of the cancel mechanism 122 are illustrated in a right-turn or "up" condition. By right-turn condition, it is meant that the vehicle 14 is being operated under normal driving conditions and the turn signal lever 120 has been actuated to activate the vehicle's right turn signals. In the right-turn condition, the turn signal lever 120 is rotated in a direction indicated generally by the curved arrow in FIG. 8d into the position illustrated in FIG. 8d. When the turn signal lever 120 is in the right-turn position of FIG. 8d, the paddle 102 is positioned extending along a third centerline 324. The third centerline 324 extends generally upward as viewed in FIG. 8d at an acute angle relative to the first centerline 320.

Referring to FIG. 9c, when the cancel mechanism 122 is in the right-turn condition, the turn signal lever 120 is rotated in a generally counterclockwise direction to the position illustrated in FIG. 9c. The counter-clockwise direction id indicated generally by the curved arrow in FIG. 9c. As the turn signal lever 120 is rotated towards the position illustrated in FIG. 9c, the return plunger 282 slides along the second surface 294 of the reaction surface 290. As the return plunger 282 slides along the second surface 294, the plunger is urged into the sleeve 284 against the bias of the spring 286. The return plunger 282, biased against the second surface 294, provides a return bias which urges the turn signal lever 120 to rotate about the axis 94 towards the normal condition of FIGS. 8a and 9a. When the turn signal lever 120 is in the right-turn condition, however, the cancel mechanism 122 blocks the turn signal lever 120 from returning to the normal condition under the return bias.

Referring to FIGS. 8a and 8d, when the turn signal lever 120 is rotated to the right-turn condition, the linkage 124 moves to the right as viewed in FIG. 8a to the position illustrated in FIG. 8d. The linkage 124, in turn, causes the latch mechanism 140, i.e. the pawl guide 160, the latch sleeve 144 and, thus, the latch plunger 142 to move to the right as viewed in FIG. 8a to the position illustrated in FIG. 8d. As the latch plunger 142 moves towards the position of FIG. 8d, the plunger slides along the reaction surface 200.

When the cancel mechanism 122 is in the right-turn condition, the latch plunger 142 is biased against the reaction surface 200 adjacent and to the right of the first tooth 202 as viewed in FIG. 8d. As discussed above, the return bias of the turn signal lever 120 urges the cancel mechanism towards the normal condition. The latch plunger 142 engages the first tooth 202, which blocks the latch mechanism 140 from moving towards the normal condition, i.e. to the left as viewed in FIG. 8d. Thus, the latch plunger 142 maintains the cancel mechanism 122 and the turn signal lever 120 in the right-turn condition of FIGS. 8d and 9c.

In the right-turn condition, the pin 240 of the cancel pawl 132 is biased against the second side portion 166 of the cam surface 162. This causes the cancel pawl 132 to be positioned in a second raised position wherein the pin 240 is seated in the upper end of the pin aperture 184 adjacent or near the second side portion 166.

When the cancel pawl 132 is in the second raised position, the cancel tooth 226 is positioned in the path of the cancel cam 136. Thus, when the cancel mechanism 122 is in the right-turn condition, the cancel cam 136 may engage the cancel tooth 226 when the cancel cam rotates with the steering axle 22 about the axis 26. Also, when the cancel pawl 132 is in the second raised position, the first cam surface 230 of the first lobe 236 is positioned adjacent or near the tip 146 of the latch plunger 142.

When the turn signal lever 120 and the cancel mechanism 122 are in the right-turn condition of FIG. 8d, the steering shaft 22 may be rotated about the axis 26 in a left-turn direction, generally clockwise as viewed in FIG. 8d. the steering shaft 22 may also be rotated about the axis 26 in a right-turn direction, generally counterclockwise as viewed in FIG. 8d. The left-turn direction is indicated by the arrow labeled 340 in FIG. 8d, and the right-turn direction is indicated by the arrow labeled 342 in FIG. 8d.

Figure 8E:
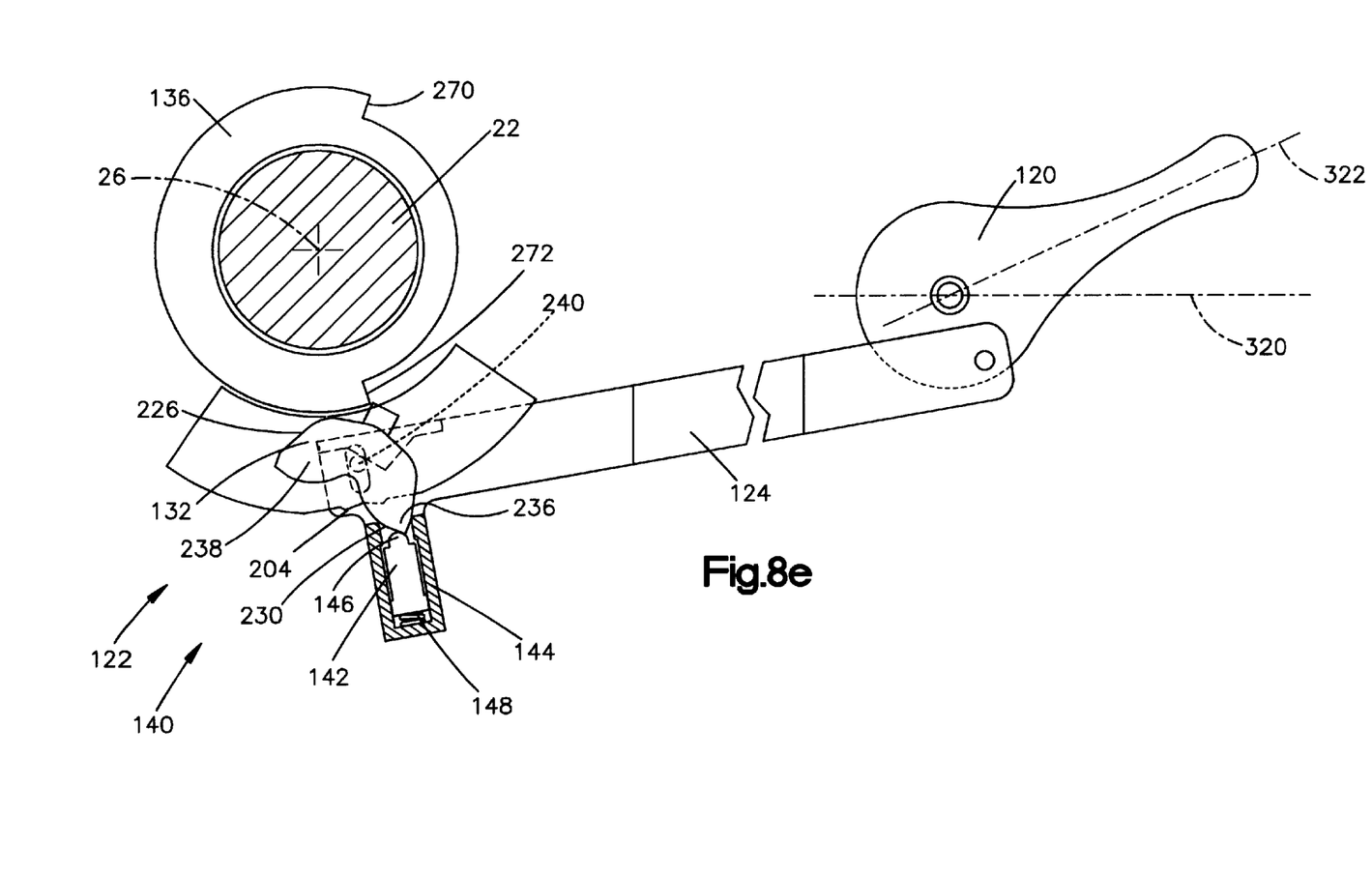

If the steering shaft 22 rotates a given distance in the right-turn direction, the second cam surface 272 will engage the cancel tooth 226. This is illustrated in FIG. 8e. As the steering shaft 22 rotates in the right-turn direction, the first cam surface 270 acts against the cancel tooth 226 and urges the cancel tooth to the right as viewed in FIG. 8e. This causes the cancel pawl 132 to pivot about the pin 240 in a clockwise direction as viewed in FIG. 8e. As the cancel pawl 132 pivots, the first cam surface 230 of first lobe 236 engages the tip 146 of the latch plunger 142 and urges the plunger into the latch sleeve 144 against the bias of the spring 148. This causes the latch plunger 142 to become disengaged from the first tooth 202, which releases the latch mechanism 140 and allows the cancel mechanism 122 to return to the normal condition of FIG. 8a under the return bias of the turn signal lever 120.

If the steering shaft 22 rotates a given distance in the left-turn direction while the cancel mechanism 122 is in the right-turn condition, the first cam surface 270 will engage the cancel tooth 226. As the steering shaft 22 rotates in the left-turn direction, the first cam surface 270 would act against the cancel tooth 226 and urge the cancel tooth to the left as viewed in FIG. 8d. This would cause the cancel pawl 132 to pivot about the pin 240 in a counterclockwise direction as viewed in FIG. 8d. As the cancel pawl 132 pivots, however, the second cam surface 232 of second lobe 238 would not engage the tip 146 of the latch plunger 142 because the latch plunger is positioned adjacent the first lobe 236 when the cancel mechanism 122 is in the left-turn condition. Thus, rotation of the steering column 22 in the left-turn direction when the turn signal lever 120 and the cancel mechanism 122 are in the right-turn condition would not release the latch mechanism 140, cancel mechanism, and turn signal lever to return to the normal condition.

Figure 10:
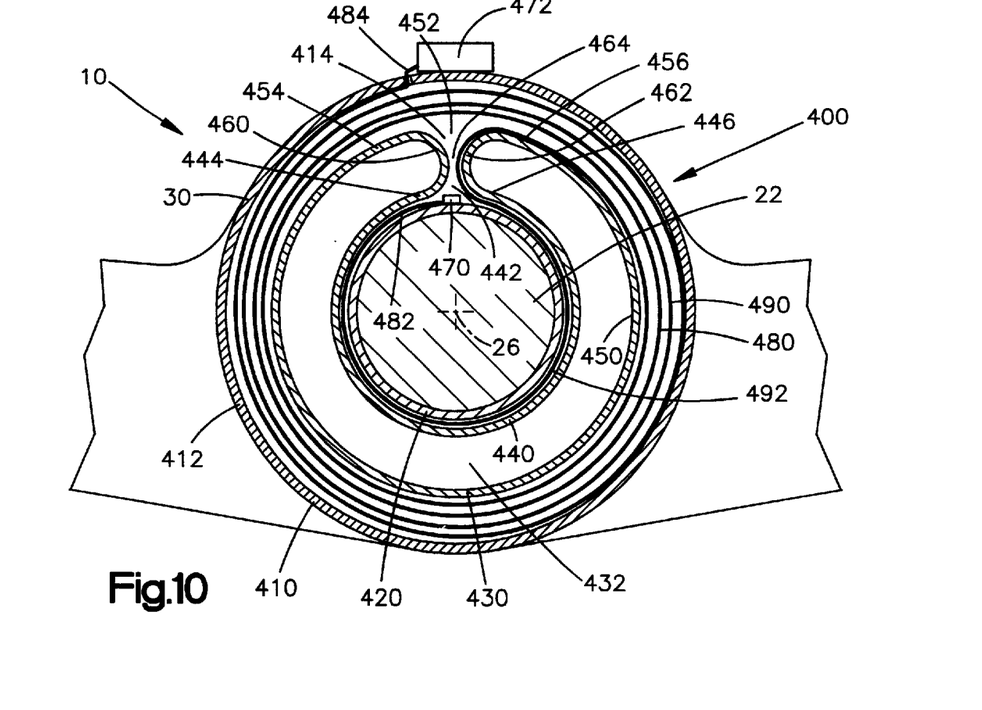
FIG. 10 is a schematic view of a portion of the switch pod assembly, with certain parts shown in section.

Referring to FIG. 10, the hub portion 30 of the switch pod assembly 10 may include a rotary connector 400 for providing an electrical connection to components that are mounted on the vehicle steering wheel 20 (FIG. 1) and moveable with the steering wheel as the steering wheel rotates.

The rotary connector 400 (FIG. 10) includes a stator 410, a rotor 420, a spacer 430, and a cable 480. The stator 410 is stationary relative to the steering wheel (not shown in FIG. 10) and the steering shaft 22. The stator 410 is molded or otherwise formed integrally with the hub portion 30 of the switch pod assembly 10. The stator 410 comprises a cylindrical stator wall 412. The rotor 420 and the stator 410 are shaped to cooperate with one another so as to define an annular chamber 414. The rotor 420 is rotatable with the steering shaft 22 about the axis 26, relative to the stator 410.

The spacer 430 is disposed within the annular chamber 414 defined by the rotor 420 and the stator 410. The spacer 430 comprises an annular base 432 with an first wall 440 extending from the peripheral edge of the base. The first wall 440 extends almost all of the way around the periphery of the base 432, leaving an opening 442 between spaced first and second ends 444 and 446 of the first wall. A similar second wall 450 extends almost all of the way around the periphery of the base 432, leaving an opening 452 between spaced first and second ends 454 and 456 of the second wall. The opening 442 in the first wall 440 is aligned with the opening 452 in the second wall 450. The first end 444 of the first wall 440 is interconnected with the first end 454 of the second wall 450 by a first end wall 460. The second end 446 of the first wall 440 is interconnected with the second end 456 of the second wall 450 by a second end wall 462. The first and second end walls 460 and 462 are spaced apart from each other to form an opening 464.

The rotor 420 and the stator 410 are each provided with electrical connectors, represented at 470 and 472, respectively, in the form of sockets for connection to suitable electrical plugs. The cable 480 comprises a flat cable including a plastics material base having at least one conductive strip laminated therein. The cable 480 is received in the chamber 414. A first end 482 of the cable 480 is connected to the connector 470 and an opposite second end 484 of the cable is connected to the connector 472. The cable 480 is wound so as to define a first coiled portion 490 housed in the chamber 414 between the second wall 450 and the stator wall 412. A second coiled portion 492 of the cable 480 extends between the first wall 440 and the rotor 420. The first and second coiled portions 490 and 492 are wound in opposite directions as illustrated in FIG. 10.

The electrical components on the steering wheel (not shown) are connected to the connector 470 on the rotor 420. Electrical components of the vehicle that are to receive signals from the components on the steering wheel are connected to the connector 472 on the stator 410.

If the rotor 420 is rotated in a clockwise direction with respect to the stator 410 as viewed in FIG. 10, the spacer 430 will also rotate in a clockwise direction. The spacer 430 is moved clockwise by winding the cable 480 onto the rotor 420. As the rotor 420 rotates in the clockwise direction, the first coiled portion 490 unwinds and passes through the opening 464. If the rotor 420 rotates in a counterclockwise direction, the cable 480 unwinds from the rotor 420 and passes through the opening 464. The cable 480 thus winds in the chamber 414 between the second wall 450 of the spacer 430 and the stator wall 412.

Advantageously, the switch pod assembly 10 positions the switch pod modules 60 and 70 and, thus, the switches 80 conveniently relative to the drivers 24 hands while operating the vehicle 14. The turn signal lever 120 is positioned relative to the steering wheel in generally the same position where known turn signal levers that extend from the steering column 12 are traditionally located. This helps to avoid driver confusion while operating a vehicle equipped with the switch pod assembly 10.

From the above description of the invention, those skilled in the art will perceive improvements, changes and modifications in the invention. Such improvements, changes and modifications within the skill of the art are intended to be covered by the appended claims.

Having described the invention, I claim:

1. A switch pod assembly for mounting to a steering column in a vehicle, said switch pod assembly comprising:

a generally cylindrical hub portion adapted to be fixedly connected to the steering column adjacent a steering wheel of the vehicle;

first and second arms that extend radially from an outer surface of said hub portion on opposite sides of said hub portion, each of said first and second arms having a first end connected to said hub portion and an opposite second end;

first and second switch pod modules extending from said second ends of said first and second arms, respectively, in a direction generally transverse to said first and second arms, each of said switch pod modules having a curved outer surface that is generally concentric with the steering wheel, said outer surface having a radius that is smaller than a radius of the steering wheel, said outer surfaces of said first and second switch pod modules being positioned proximate said steering wheel; and a plurality of switches supported by said first and second switch pod modules, said switches including actuators positioned along said curved outer surfaces of said first and second switch pod modules.

2. Apparatus as defined in claim 1, wherein said curved outer surface of said first switch pod module extends from about a three o'clock position to about a four o'clock position along said first radius, and said curved outer surface of said second switch pod module extends from about an eight o'clock position to about a nine o'clock position along said first radius.

3. Apparatus as defined in claim 1, wherein said plurality of switches comprises a plurality of pushbuttons having actuator pads arranged along said curved outer surface of said first and second switch pod modules.

4. Apparatus as defined in claim 3, wherein said first and second switch pod modules support indicators, each of said indicators corresponding to one of said pushbuttons, said indicators being adapted to provide indicia indicative of predetermined conditions of said corresponding one of said pushbuttons.

5. Apparatus as defined in claim 3, wherein said actuator pads are exposed on a side portion and a rear portion of said first and second switch pod modules.

6. Apparatus as defined in claim 5, wherein said actuator pads are positioned proximate the vehicle steering wheel.

7. Apparatus as defined in claim 4, wherein said indicators are exposed on a front portion of said first and second switch pod modules.

8. Apparatus as defined in claim 4, wherein said indicators comprise liquid crystal displays programmable to provide selected indicia.

9. Apparatus as defined in claim 1, wherein said plurality of switches comprises a thumb wheel supported by at least one of said first and second switch pod modules, said thumb wheel being exposed on a front portion of said at least one of said first and second switch pod modules, said thumb wheel being rotatable about an axis to selectively actuate said thumb wheel to one of a plurality of positions.

10. Apparatus as defined in claim 1, wherein said plurality of switches comprises a paddle supported by at least one of said first and second switch pod modules, said paddle extending laterally from said curved outer surface of said at least one of said first and second switch pod modules, said paddle being pivotable about an axis to selectively actuate said paddle to one of a plurality of positions.

11. Apparatus as defined in claim 10, wherein said paddle comprises a turn signal switch, said paddle being rotatable from a center position to radially opposite first and second positions, said switch pod assembly comprising a latch mechanism supported by said hub portion and a linkage extending through one of said first and second arms and connecting said paddle to said latch mechanism, said latch mechanism latching said paddle in said first and second positions when said paddle is rotated to said first and second positions.

12. Apparatus as defined in claim 11, further comprising a cancel mechanism, said cancel mechanism unlatching said paddle from said first and second positions when the steering wheel is rotated a predetermined distance in a predetermined direction.

13. Apparatus as defined in claim 12, wherein said latch mechanism comprises a latch plunger biased into engagement with a reaction surface to latch said paddle in said first and second positions, said cancel mechanism comprising a cancel pawl and a cancel cam rotatable with the steering wheel, said cancel cam engaging said cancel pawl and imparting movement of said cancel pawl when said steering wheel is rotated said predetermined distance in said predetermined direction, said cancel pawl having a surface that engages said latch plunger and causes said latch plunger to move out of engagement with said reaction surface to unlatch said paddle when said steering wheel is rotated said predetermined distance in said predetermined direction.

14. Apparatus as defined in claim 13, wherein said first position of said paddle is a left-turn position and said predetermined direction is a left-turn direction.

15. Apparatus as defined in claim 13, wherein said first position of said paddle is a right-turn position and said predetermined direction is a right-turn direction.

16. Apparatus as defined in claim 1, wherein said switch pod assembly further comprises a rotary connector arranged in said hub portion, said rotary connector providing an electrical connection between first and second electrical devices, said first electrical device being mounted on the vehicle steering wheel and rotatable with the steering wheel, said second electrical device being mounted on a stationary part of the vehicle.

17. Apparatus as defined in claim 16, wherein said rotary connector comprises a clockspring connector.

18. Apparatus comprising:

a vehicle steering column;

a support arm having a first end fixed to said steering column, said support arm extending in a lateral direction from said steering column;

a turn signal switch connected to a second end of said support arm, opposite said first end, said turn signal switch including a paddle pivotable about an axis to actuate said turn signal switch from a center position to radially opposite first and second positions;

a latch mechanism supported on said steering column; and a linkage extending through said arm and connecting said paddle to said latch mechanism, said latch mechanism latching said paddle in said first and second positions when said paddle is rotated to said first and second positions.

19. Apparatus as defined in claim 18, further comprising a cancel mechanism, said cancel mechanism unlatching said paddle from said first and second positions when the steering wheel is rotated a predetermined distance in a predetermined direction.

20. Apparatus as defined in claim 19, wherein said latch mechanism comprises a latch plunger biased into engagement with a reaction surface to latch said paddle in said first and second positions, said cancel mechanism comprising a cancel pawl and a cancel cam rotatable with the steering wheel, said cancel cam engaging said cancel pawl and imparting movement of said cancel pawl when said steering wheel is rotated said predetermined distance in said predetermined direction, said cancel pawl having a surface that engages said latch plunger and causes said latch plunger to move out of engagement with said reaction surface to unlatch said paddle when said steering wheel is rotated said predetermined distance in said predetermined direction.

21. Apparatus as defined in claim 20, wherein said first position of said paddle is a left-turn position and said predetermined direction is a left-turn direction.

22. Apparatus as defined in claim 20, wherein said first position of said paddle is a right-turn position and said predetermined direction is a right-turn direction.

23. A switch pod assembly for mounting to a steering column in a vehicle, said switch pod assembly comprising:

a hub portion adapted to be fixedly connected to the steering column adjacent a steering wheel of the vehicle;

first and second arms that extend from said hub portion, each of said first and second arms having a first end connected to said hub portion and an opposite second end;

first and second switch pod modules extending from said second ends of said first and second arms, respectively, in a direction generally transverse to said first and second arms, each of said switch pod modules having a curved outer surface having a radius, said radius of said curved outer surface being generally concentric with a radius of the steering wheel, said outer surfaces of said first and second switch pod modules being positioned proximate said steering wheel; and a plurality of switches supported by said first and second switch pod modules, said switches including actuators positioned along said curved outer surfaces of said first and second switch pod modules and a paddle supported by at least one of said first and second switch pod modules, said paddle extending laterally from said curved outer surface of said at least one of said first and second switch pod modules, said paddle being pivotable about an axis to selectively actuate said paddle to one of a plurality of positions.

* * * * *